United States Patent [19]

Ito

[11] Patent Number: 5,655,129
[45] Date of Patent: Aug. 5, 1997

[54] CHARACTER-STRING RETRIEVAL SYSTEM AND METHOD

[75] Inventor: Nobuyasu Ito, Shimosakanobe, Japan

[73] Assignee: International Business Machines Corporation, Armonk, N.Y.

[21] Appl. No.: 395,731

[22] Filed: Feb. 28, 1995

[30] Foreign Application Priority Data

May 23, 1994 [JP] Japan ................................ 6-108186

[51] Int. Cl.$^6$ .................................................. G06F 3/14
[52] U.S. Cl. ................................ 395/760; 395/794
[58] Field of Search ............................... 395/759, 760, 395/793, 794, 601, 603, 605, 611, 612, 613, 616; 341/51, 106

[56] References Cited

U.S. PATENT DOCUMENTS

| | | | |
|---|---|---|---|
| 5,267,165 | 11/1993 | Sirat .................................. | 395/760 |
| 5,303,150 | 4/1994 | Kameda ............................. | 395/759 |
| 5,349,645 | 9/1994 | Zhao .................................. | 395/2.52 |
| 5,357,431 | 10/1994 | Nakada et al. .................... | 395/793 |

*Primary Examiner*—Jeffery Hofsass
*Assistant Examiner*—Andrew Hill
*Attorney, Agent, or Firm*—Stephen C. Kaufman

[57] ABSTRACT

In a TRIE dictionary, it is to retrieve a character string including a wild card and a normal expression at high speed. By extract a substring of M characters from the start of a word character string of length L, making a backward TRIE having the end of the substring as a route node with the aid of the substring, deciding a prefix portion from a substring in which the number of input characters has been decided to be small, and retrieving an original TRIE, both the necessary cost of space (dictionary size) and the retrieval cost (retrieval time) are balanced.

6 Claims, 4 Drawing Sheets

Backward TRIE dictionary (3 characters)

CHARACTER-STRING RETRIEVAL SYSTEM AND METHOD

FIELD OF THE INVENTION

The present invention relates to a method of retrieving a dictionary having tree structure called TRIE and, more particularly, to a method of retrieving a dictionary of the same structure as a character string including ambiguity which is to be input.

BACKGROUND OF THE INVENTION

Up to now, an operation for retrieving information on a character string from a dictionary has been widely conducted, particularly in the area of text processing such as, for example, spelling correction, kana-kanji (Japanese syllabary) transformation, and keyword retrieval. Hence, the data structure and the method of dictionary retrieval have become primary factors in determining the speed of processing. Therefore, a structure and a method are desired which are capable of realizing high-speed retrieval while, at the same time, keeping the cost of space low enough to be at an acceptable extent.

Among the methods proposed to do this, the data structure that is used the most is called a TRIE. It is known that the TRIE is a type of tree structure, and that the time required for using a dictionary depends almost only on the length of the input character string, and that the data compression efficiency is relatively good. The TRIE is disclosed in Knuth D. E., The Art of Computer Programming, Vol. 3, Chapter 6, Sorting and Searching, Addison-Wesley, 1973.

FIG. 1 schematically shows the TRIE dictionary giving a kana character (Japanese syllabary) name as an example. In FIG. 1(A), is shown an example of the portion corresponding to a name which starts with the syllable "ma," e.g., Matsushita, Matsuki, Matsuda, Masuda, and Matsushima.

Words in which the left-substrings, viewed from their start, are the same are collected into one and expressed as a tree structure in which one character corresponds to one node. A character aggregation that can follow one substring is connected to a child link extending from a parent node (the node corresponding to the end character of the above-described left substring), and the elements of the character aggregation are interconnected by sibling links. In the example in this figure, the character aggregation that can be the start of a word is first connected through a child link of a route node 10 by sibling links, and a list is constructed. Next, in correspondence to the character aggregation in this example, "su" and "tsu," which can follow the first character "ma," nodes 13 and 14 exist through a sibling link 12 ahead of a child link 11 of "ma." In other words, the first two characters of a word having the left substring "ma" are to be collected into a tree structure having the node 11 as a parent and the nodes 13 and 14 as children. Ahead of the child link 15 of the node 14 are nodes corresponding to three characters, "ki," "shi," and "da," which is a character aggregation that can follow the left substring "matsu" which are interconnected by sibling links 16 and 17. Thus, the TRIE is one which expresses a word aggregation with nodes corresponding to the characters and child and sibling links connecting the nodes.

Retrieval begins with an operation for extracting the first character of an input character string and then retrieving a character aggregation connected to the child link extending from the route node of a dictionary. More particularly, the input character is compared with the node of the dictionary (the character corresponding to that node) while tracing the sibling links in sequence. If they coincide with each other, the child link of that node is traced and the next input character of the input character string is compared with the character aggregation that follows. If they do not coincide with each other, a character that coincides with the first character of the input character string is to be retrieved while further tracing the sibling links continues. There are some cases where, in a very large TRIE, the length of the sibling links becomes long and a substantial time is required for retrieval but, in such cases the TRIE is used together with a hash method by a certain number of characters from the first character. In addition, if a word set (subtree) corresponding to a first character or hash value is stored in a continuous region, even if the TRIE is in external storage, the number of random accesses will be relatively small and there will be no possibility that the access time will increased greatly. Therefore, as long as the sibling links are not excessively long, all of the words with various lengths can be retrieved at high speed even if the word length is not clear.

It is to be noted that the retrieval character string will hereinafter be referred to as a character candidate lattice as circumstances require. That meaning, for example, is explained by taking as an example a normal expression such as [maarakaku]tsu[shimi][a-ko]. More particularly, in the normal expression such as [maarakaku]tsu[shimi][a-ko], each of [maarakaku], tsu, [shimi], and [a-ko] expressing a character or characters that coincide individually and sequentially is called a column and, as will become clear, each column can specify not only a single character but a plurality of characters. Then, if characters that can coincide in the column are extended in a longitudinal direction and the row of the column is extended in a transverse direction, a two-dimensional spread will be obtained. This is why the character string is called a lattice.

The above description was made of the retrieval of a settled character string, a description will hereinafter be made, with the aid of the candidate character string lattice defined above, about a case in which ambiguity is contained in the input character string, such as the case in which it is unclear if there is the possibility that a plurality of characters is in one column, i.e., the case in which there is a wild card character that matches with arbitrary character. In an actual application such as the case in which an ambiguous retrieval is required as a result of character recognition or when users do not remember the spelling of a word correctly, a retrieval request for such input occurs frequently. This input can be expressed generally by a normal expression. For example, a normal expression in which the first character is "ma" or "ya," the second character is ambiguous, and the following characters are "shita" becomes "[maya]?shita." In order to accept such input in the retrieval of a dictionary expressed with the TRIE:

If there is the possibility of a plurality of characters, the sibling links are traced for each. If found, the child links are traced and character comparisons of the next columns are performed in parallel.

In the case of a wild card matching all characters, the child link is traced for all of the characters of the character aggregation and the character is compared with that in the next column.

If it is now assumed that there is the possibility that, with respect to an input character, $n[i]$ characters exist at a certain column i, and it is also assumed that, in a nest corresponding to column i in a dictionary, $N[i]$ characters exist per node, the work quantity at the column i will become a value proportional to $T[i]$, which is expressed by the following equation:

$$T[i] = f[i-1] \times n[i] \times E(N[i]) \quad \text{[Equation 1]}$$

(case in which an input character is not '?')

$$= F[i-1] \times E(N[i]) \ldots (1)$$

(case in which an input character is '?')

where F[i-1] represents the number of branches when moving from column i-1 to column i, i.e., the number of child links traced, and E(x) represents the expected value of x. Further, strictly speaking, the number of branches F[i] in column i depends on the frequency of each character with respect to each column, since F[i] is a number that represents this during the character comparison, the column goes ahead with the degree of coincidence. If it is assumed that the frequency is almost constant, since the number of branches F[i] can be considered to be proportional to the product of the previous number of branches (F[i-1]), the number of characters (n[i]) corresponding to the columns in an input character string, and the expected value E(N[i]) of the number of characters connected to current nodes in the dictionary, divided by the number of categories of all characters (Nc), the F[i] can expressed as follows:

$$F[i] = n[i]/Nc \times E(N[i]) \times F[i-1] \quad \text{[Equation 2]}$$

where F(0)=1.

As will be clear from these equations, the work quantity T[i] is proportional to a sequential product, $F(0) \times F(1) \times \ldots \times F[i-1]$, so that the total of the work quantities depends upon how the number of branches F[i] is reduced. It is to be noted that, in Equation (2), n[i] is a value dependent on only the retrieval character string lattice, while E(N[i]) depends only upon the TRIE structure and is a value independent of the retrieval character string lattice.

SUMMARY OF THE INVENTION

As will be clear from the above-described consideration, the work quantity will become excessively large if a dictionary with a TRIE structure is retrieved, since, in the case of an input character string having a wild card in its prefix or including a large number of possibilities, the number of branches (F[i]) is large and all must be retrieved. That is, retrieving "matsushita" and "matsushima" from "matsushi?" can be performed at relatively high speed, but if a word such as "matsushita" and "yamashita" is retrieved from "?[tsuma] shita," the cost will become extremely high. This is exactly the same even if the TRIE structure is used together with a hash method, as long as the method of calculation depends on the prefix, so that all of the subtrees corresponding to all of the possibilities (hash value) must also be retrieved.

Accordingly, an object of this invention is to provide a TRIE dictionary and a method for retrieving the TRIE dictionary which are capable of high-speed retrieval even when retrieving a retrieval character string such as one having a wild card in the prefix portion of an input character string or a large number of candidate characters.

[Means for solving the problems]

A simple method to solve the above-described problems is to regard a wild card ("?") as a word, and to register in advance, as a word a character string in which the original expression is replaced with "?. " For example, if a character string such as "?tsushita" or "ma?shita" is also registered with respect to the word "matsushita" and a word attribute is held ahead of the TRIE corresponding to the word and, at the same time, a character aggregation representative of a wild card is held as a list, the retrieval of such a character string could be performed at high speed. However, since, in this method, derived patterns taking all possibilities of an input into consideration have to be registered in advance for one word, the cost of space cannot be neglected. In fact, the number of derived patters in which an arbitrary number of characters of a word of L characters are replaced with a wild card is expressed as follows:

$$\sum_{r=1}^{L} C[L, r] = 2^L \quad \text{[Equation 3]}$$

where C[L,r] represents the number of combinations because r characters are extracted from L characters. Therefore, the cost of space cannot be accepted unless a dictionary is constituted only of words where L is sufficiently small. In addition, in this method, there is no improvement for the case in which the prefix of a word is not a wild card but an input has a large number of possibilities (e.g., "[maaiue . . . ]tsushita").

As will be understood from Equation (2), the number of branches F[i] depends on the branch of each node in a dictionary, i.e., an expected value E(i) of the subsequent characters interconnected by the sibling links. In the case of a normal dictionary, the value is large at the beginning but is reduced at an extremely high speed, as the hierarchy number, i.e., i, becomes greater. For example, when a dictionary comprising about 29000 Japanese kana names was made with the TRIE structure, the result shown in Table 1 was obtained.

TABLE 1

Number of branches in each hierarchy of the TRIE dictionary:

| Hierarchy number | Average number of branches |
|---|---|
| 1 | 44.0 |
| 2 | 31.5 |
| 3 | 7.9 |
| 4 | 1.6 |

Therefore, in the TRIE dictionary, it must be ensured that neither the number of branches n[i] of an input nor the number of branches E(N[i]) in the dictionary increase.

In consideration of the above-described point, the present invention, by extracting a substring of M characters from the start of a word character string of length L, making a backward TRIE having the end of the substring as a route node with the aid of the substring, deciding a prefix portion from a substring in which the number of input characters has been decided to be small, and then retrieving an original TRIE, is intended to balance both the necessary cost of space (dictionary size) and the retrieval cost (retrieval time).

We now disclose a computer-based method for retrieving TRIE dictionaries, comprising the steps of:

(a) constructing a forward TRIE dictionary from a plurality of character strings and storing the resulting forward TRIE dictionary in a computer memory or media;

(b) constructing a fixed-length backward TRIE dictionary for each of the left substrings of each of said plurality of character strings which are the constituents of said forward TRIE dictionary, said fixed-length backward TRIE dictionary beginning with the last character of said left substring and ending with the first character of said left substring;

(c) inputting a candidate character string lattice;

(d) when said candidate character string lattice comprises M columns where M represents an integer number, calculating the work quantity for backward TRIE dictionary retrieval from a column k where k represents an integer number, for each of k=1, M, and thereby determining said column k in which said cost is minimum;

(e) in response to the determination of said column k in said step (d), retrieving said backward TRIE dictionary made in said step (b) and having a length of k, with a left substring of said candidate character string lattice up to said column k, and storing the retrieval results; and (f) retrieving said forward TRIE dictionary based on said retrieval results stored in said step (e) and displaying or saving the retrieval results.

DETAILED DESCRIPTION OF THE INVENTION

Figure 1A:
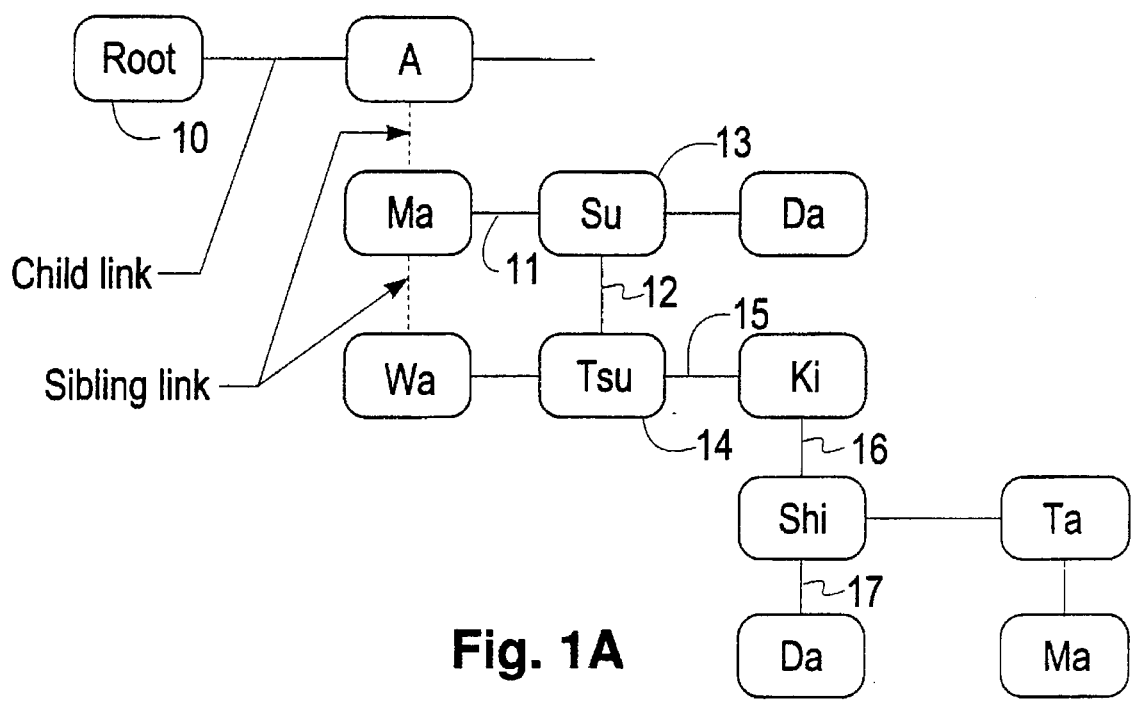
FIGS. 1(A) and 1(B) are illustrations used to explain forward and backward TRIE dictionaries, respectively.
Figure 1B:
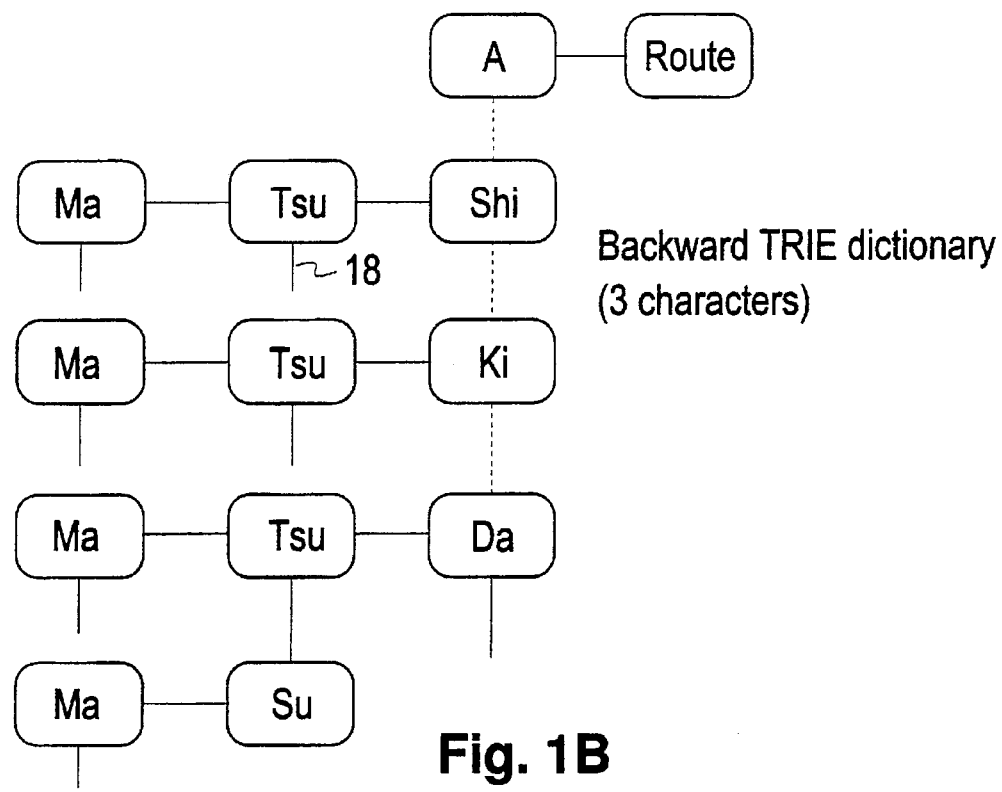
Figure 2:
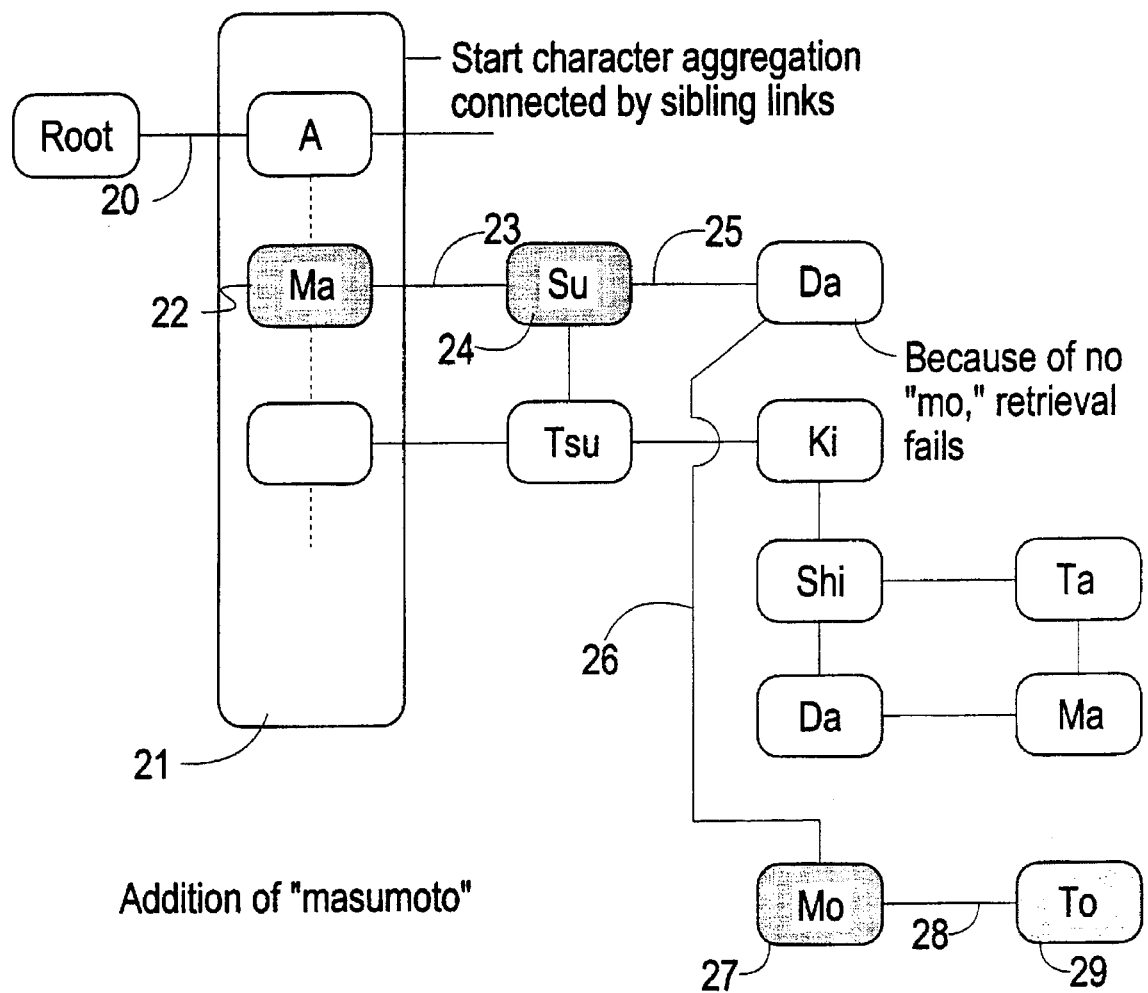
FIG. 2 is an illustration used to explain processes by which a TRIE dictionary is made.
Figure 3:
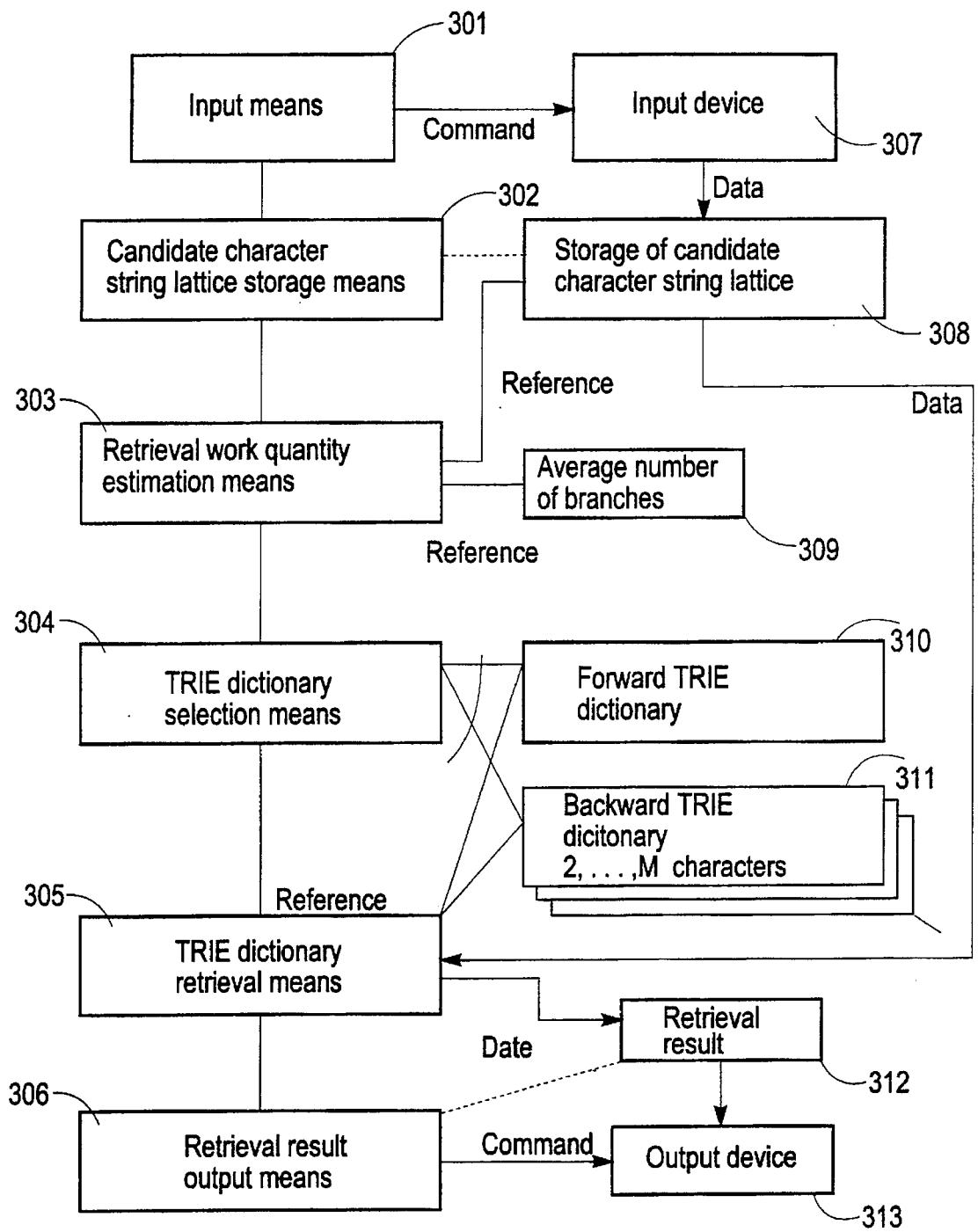
FIG. 3 is a block diagram showing the functional construction of a candidate character string lattice dictionary retrieval system of the present invention.

An embodiment of the present invention will be described with reference to FIGS. 1 to 4. FIG. 3 shows the overall function configuration and the data flow of a candidate character string lattice dictionary retrieval apparatus of the present invention.

A candidate character string lattice, which is an input, is first input from an input device 307 such as a keyboard (not shown) and a magnetic disk device which are connected, for example, to a personal computer PS/55 (trademark of IBM). In accordance with the control of the input means 301, which is a control program residing in the main storage of a computer, the candidate character string lattice input by the input device 307 is stored as a candidate character string lattice 308 in a predetermined region in the main storage of the computer by the candidate character string lattice storage means 302, which is a control routine in the main storage of the computer. Thereafter, the candidate character string lattice storage means 302 provides the candidate character string lattice 308 for reference, or transfers it, when necessary. As shown in FIG. 3, through an input device 307 connected to a permanent storage means such as a magnetic disk (not shown), the input means 301 also stores the particular content of the files stored on the magnetic disk in a candidate character string lattice storage 308, when necessary. The retrieval work quantity estimating means 303 which is also a control routine in the main storage of the computer calculates a retrieval starting position in which the work quantity of dictionary retrieval is expected to become small from data on the average number of branches 309 which is obtained when the candidate character string lattice and a TRIE dictionary are made and which is held in a permanent storage means such as a magnetic disk (not shown).

This retrieval work quantity estimating means 303 and the concept of the average number of branches are the gist of the present invention, and they will be described later in greater detail. If a TRIE dictionary selecting means 304 which is a control routine in the main storage of the computer selects a TRIE dictionary corresponding to the calculated starting position, the TRIE dictionaries 310 and 311 which are control routines in the main storage of the computer will be retrieved by the TRIE dictionary retrieving means 305 which is a control routine in the main storage of the computer. The retrieval result 312 is written to a predetermined region of the main storage or a permanent storage means such as a magnetic disk (not shown). The retrieval result outputting means 306 which is also a control routine in the main storage of the computer transmits the retrieval result 312 to an output device 313 such as a CRT device connected to the computer. The output device 313 displays the retrieval result 312 to users.

Assume now that "?tsushita" is input. According to above-described Table 1, for this input, 44 branches exist at the first character, and it is necessary to perform the retrieval of the second character, i.e., to trace a child link and perform a character comparison for all of the branches. However, if "tashitsu?" is retrieved in backward, it can be expected that the number of branches is greatly reduced. This is a most extreme example, but it is obvious that, if the retrieving order is selected so that a product of the number of characters on the input side and an expected value of the number of branches on the dictionary side (E(N[i])×n[i]) becomes small, a TRIE dictionary can be retrieved at high speed. If TRIE dictionaries corresponding to all of the arbitrary orders are made, since the dictionary size becomes too large, backward TRIE is to be made from the end of a substring comprising the first M characters of a word, as shown in FIG. 1(B).

[Making of a Forward TRIE Dictionary]

The making of the TRIE structure will be described with reference to FIG. 2. It is now assumed that the TRIE structure shown in FIG. 1(A) has already been made and a word "masumoto" which does not exist in a dictionary is additionally registered. First, the "ma" which is the first character of the word to be added is retrieved by sequentially tracing the sibling links of the first character aggregation 21 connected to a child link 20 of a route node. Since "ma" is found at a node 22, a child link 23 of that node is traced and the next character "su" is retrieved. That is, the process of adding a word is identical to the process of retrieving a dictionary, as long as there exists a node that coincides with the first substring of a word to be added. In this case, the second character "su" exists at a node 24, a child link 25 of that node is traced, and the third character "mo" is compared with the next character aggregation. However, in the character aggregation connected to the child link 25 of "su," only "da" exists and therefore the retrieval fails. A dictionary retrieval is to be ended at the time it is found that a corresponding word does not exist but, in the case of a word addition, a sibling link 26 is added to the character aggregation in which the retrieval failed, and there is made a node 27 corresponding to the character "mo" which did not exist. Then, a child link 28 extends from the node 27, and a node 29 corresponding to the following character "to" is to be made. If the word further includes characters, the characters will be taken out one by one and the extension of a child link and the making of a node will be repeated until the word is ended.

A dictionary of the same structure is obtained by repeating such additional registration for each word of a given word aggregation. That is, in an initial stage, a word is registered in a dictionary in which only a route node exists, and the operation of adding the next word to the obtained TRIE dictionary is repeated for the number of words. The TRIE structure can cope with all of the registered words by increasing the number of nodes each time a word is registered. The forward TRIE dictionary 310 which was made in the above-described manner and in which a word is added when necessary, is permanently and rewritably stored in a readable/writable storage medium connected to a computer, such as a magnetic disk storage device (not shown) or an optical magnetic disk device (DASD) (not shown). As shown in FIG. 3, at the time of actual retrieval, the forward TRIE dictionary 310 is accessed by the TRIE dictionary selecting means 304.

[Making of Backward TRIE Dictionary]

The making of the backward TRIE dictionary is identical in principle to the making of the forward TRIE dictionary but, in the making of the backward TRIE dictionary it is first necessary to obtain reverse forms of character strings for all of the left substrings for each word. For the word "Matsushita," the left substrings and the reverse forms of character strings are obtained as shown in Table 2.

TABLE 2

| Length | Left substring | Reverse form of character string |
| --- | --- | --- |
| 2 | Matsu | Tsuma |
| 3 | Matsushi | Shitsuma |
| 4 | Matsushita | Tashimatsu |

The reverse form of a character string such as this is made for all of the words, and a backward TRIE dictionary is made from the strings of the same length. In FIG. 1(B), there is shown only a 3-character backward TRIE dictionary corresponding to the subtree (word aggregation) shown in FIG. 1(A). However, in fact, the dictionary is constructed from the reverse form of character strings of the 3-character length taken out of all of name words such as a 3-character reverse form of the substring "shiketa" taken out of "takeshita." Thus, in addition to an original TRIE dictionary, the above-described backward TRIE dictionary is made for each left substring of 1 character to M characters. The average number of branches of each TRIE dictionary is recorded as data on the average number of branches 309 on a permanent recording medium such as an magnetic disk and an optical magnetic disk. More particularly, for the forward (E(N[i]), the number of columns counted from the first character is recorded, and, for the backward (E(Nb[j]), the number of columns counted from the first character of a reverse form of character string, i.e, the end of a left substring, is recorded. At the time of retrieval execution, the total of work quantities is assumed to be based on a value of the data 309. Exactly speaking, E(Nb[j]) can be considered to be different depending on the based first substring, but an average value of these can be used for simplicity.

A further description will be made as to the average number of branches. If it is assumed that, for example, 100 branches extend from a route node, the average number of branches in hierarchy 1 will be 100/1 =100. In order to obtain the average number of branches in hierarchy 2, it is calculated how many branches extend from each of the 100 branches. All of the calculated branches are added up, and the sum is divided by 100. In this manner, calculating the average number of branches is possible up to the arbitrary hierarchy that the TRIE structure allows. It is to be noted that the number of branches is a value determined by only the TRIE structure constructed.

The backward TRIE dictionary 311 which was made in the above-described manner and in which a word is added when necessary, is permanently and rewritably stored on a readable/writable storage medium connected to a computer, such as a magnetic disk storage device (DASD) (not shown) or an optical magnetic disk device (not shown). As shown in FIG. 3, at the time of actual retrieval, the backward TRIE dictionary 311 is selectively accessed by the TRIE dictionary selecting means 304. It is to be noted that a plurality of the backward TRIE dictionaries 311 exists, unlike the forward TRIE dictionary 310, and each of the dictionaries is made individually for each substring of the Mth character of a word to be retrieved (M=1, 2, . . . ) and is added.

[Retrieval]

A retrieval of the dictionaries made in the above-described manner will hereinafter be described in detail. In the first stage of the retrieval, the portion in which the number of branches F[i] is small is retrieved. The case that a word length is completely indeterminate will be described later but, if it is assumed that the word length is more than M characters, (a) An estimated value F[i] of the number of the branches is obtained for each of i=1, . . . , M by Equation (2), and a work quantity w[1] as the forward TRIE is retrieved by the normal method, is estimated by the following Equation.

$$w[1] = \sum_{i=1}^{M} F[i] \qquad \text{[Equaiton 4]}$$

(b) For k=2, . . . , M, the backward TRIE dictionary is retrieved from column k to narrow the extent of the prefix portion and, after the prefix portion has been replaced with the backward TRIE dictionary, the work quantity (w[k]) as the forward TRIE is retrieved is estimated by the following Equation:

$$w[K] = \sum_{i=1}^{k} Fb[i] + Fb[1] + \sum_{i=k+1}^{M} F[i] \ldots (3) \qquad \text{[Equation 5]}$$

where Fb[i] is calculated with Equation (2) in which N[i] was replaced with Nb[i]. Also, F[k-1] as F[k] is calculated and is replaced with Fb[1]. Further, the number of branches concerning the replaced prefix portion is smaller than at least Fb[1], since it is obtained when the backward TRIE dictionary is traced. Hence, that number of branches is estimated as an upper limit by Fb[i]. Further, it is to be noted that, in Equation (2) which Equation (3) quotes, the data 309 (FIG. 3) on the number of branches which are calculated at the time the forward TRIE structure and the backward TRIE structure have been constructed and which are stored on the disk, are used as E(N[i]) and E(Nb[i]). More particularly, E(N[i]) and E(Nb[i]) are the average number of branches in the ith hierarchy where i represents an integer number.

(c) Among w[i] (i=1, . . . ,M), the smallest one is obtained, and i at that time is made im.

(d) A backward TRIE is retrieved from the column im, and thereafter, if necessary, a forward TRIE is searched and a dictionary retrieval is performed.

That is, it is the gist of the present invention to evaluate the work quantity as the TRIE is retrieved from the column ith, with the sum of branches at each point in time, and to start searching from a column in which the work quantity becomes minimum. For example, in the case of a character string lattice being [maarakaku]tsu[shimi][a-ko], the number of candidates is 5, 1, 2, and 10. If w[i] where i=1, . . . ,4 is calculated according to Equation (3), w[i] becomes 8.5, 7.8, 5.0, and 22.2 in sequence, and w[i] becomes the minimum value when i=3. Therefore, a backward TRIE is retrieved from the third character, and a forward (i.e., normal) TRIE retrieval is to be performed for each substring decided as a result of the backward TRIE retrieval. In the case of ma?[shimi][tara], the second character is a wild card "?," and the number of candidates becomes 50 if it is assumed that it is a katakana name including only a clear sound. Therefore, if the same calculation is performed, w[i] will be 38.8, 110.0, 76.8, and 22.8, so that the maximum efficiency can be expected if the backward TRIE is retrieved from the tail character. If the backward TRIE is retrieved, a sublattice comprising only candidates in which there is the possibility of a success in retrieval is obtained from among sublattices comprising the mi characters extracted from the left portion of an input. In other words, only if a prefix portion is inspected, a sublattice that no longer exists in a dictionary is to be excluded. Then, a forward TRIE is retrieved again for the remaining sublattices, and the result is obtained. It is a matter of course that, in the case of im=1, since the forward TRIE is retrieved from the beginning, retrieving the forward TRIE dictionary repeatedly is not needed. The processes described above are shown in FIG. 4.

Figure 4:
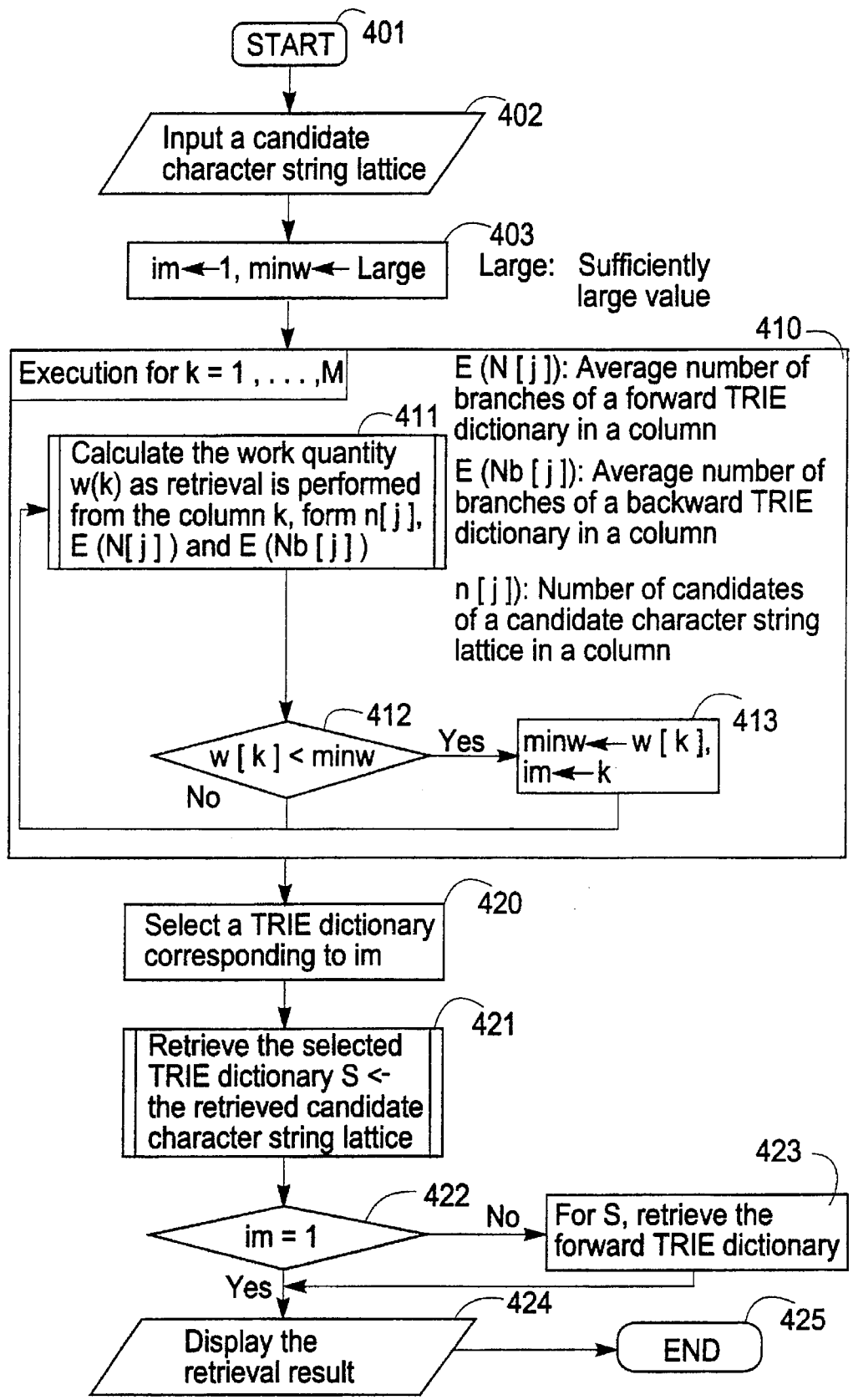
FIG. 4 is a flowchart diagram showing an algorithm of the TRIE dictionary retrieval with respect to the candidate character string lattice.

More particularly, the character retrieval processing according to the present invention is started in step 401 of FIG. 4. In step 402, a retrieval character string that may include a wild card and a normal expression are input by the user operating a keyboard and the like.

In step 403, 1 is stored for a control variable im and an arbitrary value is stored for another variable minw. The arbitrary value (shown as "Large" in FIG. 4) is much greater than a value that w[k] where k is an integer greater than 1 can normally have.

Step 410 bears the most important process of the present invention, and in step 410, steps 411, 412, and 413 are executed as to the individual columns of the input retrieval character string (for example, in the case of a retrieval character string such as [maarakaku]tsu[shimi][a-ko], the [maarakaku], tsu,[shimi], and [a-ko] are an individual column).

More particularly, as to k=1, in step 411 the work quantity w[l] is calculated with the above-described Equation (3), based on the average number of branches of the forward TRIE dictionary in the first column and on the number of candidates on the candidate character string lattice in the first column.

Next, in step 412, the w[l] thus calculated is compared with the variable minw defined in step 403. Since the variable minw is selected to be a greater value by definition, the determination in step 412 is always affirmative with respect to k=1. Consequently, in step 413, the work quantity w[l] is stored for the variable minw and 1 is stored for the control variable im.

Next, the same processing is also performed for k=2. Since the work quantity w[l] has already been stored for the variable minw, step 413 is executed only when w[2]<w[l]. When the processing is completed in the above-described manner for k=1 . . . M, a value of k where w[k] is the minimum is to be stored for the control variable im.

Then, in step 420, the forward TRIE dictionary 310 or backward TRIE dictionary 311 corresponding to the control variable im calculated in step 410 is selected by the TRIE dictionary selecting means 304 (FIG. 3). In step 421, the backward TRIE dictionary selected according to the value of the control variable im is retrieved, so that a character string (aggregation) of length im indicating that the retrieval succeeded is stored in a S.

In step 422, it is determined whether the control variable im is 1. If im is 1, since it is meant that the forward TRIE dictionary 310 has been selected and the normal TRIE dictionary retrieval has been performed, in step 424 the result of the retrieval is immediately displayed and in step 425 the processing is completed.

If the determination in step 422 is negative, i.e., the control variable im is more than 2, since the backward TRIE dictionary 311 corresponding to the length of im has been selected, the character string is partially retrieved only. Therefore, in step 423, the forward TRIE dictionary 310 is retrieved from the first column for each character string of the length im listed as S.

If the forward TRIE dictionary 310 is thus retrieved and the retrieval is completed in step 423, in step 424 the result of the retrieval will be displayed and in step 425 the processing will be completed.

It is to be noted that, since a word length has been assumed to be greater than M, if a retrieval is started from the column im, it is obvious that a word shorter in word length than im cannot be retrieved. It is also to be noted that, in the case of a word being shorter than M, it is necessary to gradually reduce M to a smaller value and to repeat the above-described operation or retrieve using the a normal method.

[Advantage of the invention]

The retrieval time will be evaluated first. Because the retrieval is performed from the first column with the normal method, a work quantity $T_{org}$ is obtained from Equations (1) and (2).

$$T_{org} = \sum_{i=1}^{L} T[i] = \sum_{i=1}^{L} (F[i-1] \times n[i] \times E(N[i]))$$ [Equation 6]

where f[0]=1 and L represents an average word length.

If a value of this equation with respect to an input of "?XXX" where X represents a character that is not a wild card, on the one hand, is calculated from the number of branches in Table 1 and the number of character categories (in this example, the number of clear sound kana is 50), the result will be obtained as shown in Table 3.

TABLE 3

Work quantity with respect to input "?XXX" (e.g., "?tsushita")

| | Branch f[i − 1] | Work quantity T[i] | Branch f[i] |
|---|---|---|---|
| i = 1 | 1 | 1 × 44 | 44 |
| i = 2 | 44 | 44 × 31.5 | 0.63 × 44 |
| i = 3 | 27.72 | 27.72 × 7.9 | 27.72 × 0.158 |
| i = 4 | 4.38 | 4.38 × 1.6 | |

Total: About 1577

On the other hand, because the retrieval is started from column k, a work quantity $T_{improved}$ is the sum of the retrieval time of a word having a length of more than L (work quantity of the backward TRIE and, if necessary, the forward TRIE) and the work quantity as words shorter than L are retrieved in sequence from the start or end. If E(N[i])=E(Nb[i]) for simplicity, the work quantity $T_{improved}$ will be obtained as follows:

$$T_{improved} = \sum_{1=i}^{k} (F[i-1] \times n[i] \times E(N[i])) + \sum_{i=1}^{L} (F[i] \times n[i] \times$$

$$E(N[i]) + \sum_{j=1}^{k-1} \sum_{i=1}^{j} (min(F[i], f[i]) \times n[i] \times E(N[i]))$$

[Equation 7]

where F'[i] represents the number of branches after they have been narrowed with the backward TRIE, and min(x,y) represents a smaller value of x and y. If, as for the input "?XXX," is calculated from Table 2 and under the same condition, it will be obvious that the retrieval from the end is the most effective, and 269.4 will be obtained. In this case, 1577/269.4=5.85 and it is therefore understood that the retrieval according to the present invention is six times faster than the above-described conventional method. Since the method according to the present invention becomes more effective when a value of E(N[i]) is more rapidly reduced with respect to an increase in i, the present invention can be expected to be more effective in a kanji dictionary and the like.

Next, the cost of space required by the method of the present invention will be evaluated. In the method of the present invention, in addition to the forward TRIE which is an original dictionary, it is necessary to have the backward TRIE for each of n=2, . . . , M. The cost of space can be estimated with the aid of the average number of branches E(N[i]).

$$\prod_{i=1}^{M} E(N[i]) \qquad \text{[Equation 8]}$$

Therefore, a capacity necessary for the backward TRIE dictionary will become as follows:

$$\sum_{i=1}^{M} \prod_{j=1}^{i} E(N[i]) \qquad \text{[Equation 9]}$$

When M=4, this value is about 29900 and 2.7 times (=(29900+17520)/17520), as compared to an original TRIE having a value of 17520. Accordingly, the cost of space is acceptable enough.

While in the embodiment the backward TRIE dictionary has been constructed by a binary tree, which is the most standard data structure, in other words, a child link and a sibling link, it may also be constructed by other data structures having equivalent information such as a double array. The double array is described in "High-Speed Digital Retrieval Algorithm by Double Array," Electronic Communication Society Thesis Journal, J71-D, 9, pp. 1592–1600 (1987).

In addition, the constant term of the above-described Equation (3) is arbitrary and, for example, the term of Fb[l] in Equation (3) may be omitted.

I claim:

1. A computer-based method for retrieving TRIE dictionaries, comprising the steps of:

(a) constructing a forward TRIE dictionary from a plurality of character strings and storing the resulting forward TRIE dictionary in a computer memory or media;

(b) constructing a fixed-length backward TRIE dictionary for each of the left substrings of each of said plurality of character strings which are the constituents of said forward TRIE dictionary, said fixed-length backward TRIE dictionary beginning with the last character of said left substring and ending with the first character of said left substring;

(c) inputting a candidate character string lattice;

(d) when said candidate character string lattice comprises M columns where M represents an integer number, calculating the work quantity for backward TRIE dictionary retrieval from a column k where k represents an integer number, for each of k=1, . . . M, and thereby determining said column k in which said cost is minimum;

(e) in response to the determination of said column k in said step (d), retrieving said backward TRIE dictionary made in said step (b) and having a length of k, with a left substring of said candidate character string lattice up to said column k, and storing the retrieval results; and (f) retrieving said forward TRIE dictionary based on said retrieval results stored in said step (e) and displaying or saving the retrieval results.

2. The method as set forth in claim 1, which further comprises the step of calculating the average number of branches in advance for each hierarchy, based on said forward TRIE dictionary constructed in said step (a), and storing the calculation result in a computer memory or media, and wherein in said step (d) said work quantity is calculated based on the value of the sum of each product of the number of branches and said average number of branches in each column.

3. The method as set forth in claim 1, wherein said candidate character string lattice is expressed in a normal expression with a fixed character string length.

4. A computer-based system for retrieving TRIE dictionaries, comprising:

(a) a forward TRIE dictionary constructed from a plurality of character strings and stored in a computer memory or media;

(b) a fixed-length backward TRIE dictionary constructed for each of the left substrings of each of said plurality of character strings which are the constituents of said forward TRIE dictionary, said fixed-length backward TRIE dictionary beginning with the last character of said left substring and ending with the first character of said left substring;

(c) a means for inputting a candidate character string lattice;

(d) a means for, when said candidate character string lattice comprises M columns where M represents an integer number, calculating the work quantity when said backward TRIE dictionary is retrieved from a column k where k represents an integer number, for each of k=1, . . . , M, and for determining said column k in which said cost is minimum;

(e) a means for, in response to the determination of said column k, retrieving said backward TRIE dictionary having a length of k, with a left-substring of said candidate character string lattice up to said column k, and for storing the retrieval results; and (f) a means for retrieving said forward TRIE dictionary based on the stored retrieval results and for displaying or saving the retrieval results.

5. The method as set forth in claim 4, which further comprises a means for calculating the average number of branches in advance for each hierarchy of said forward TRIE dictionary in accordance with the construction of said forward TRIE dictionary and for storing the calculation result in a computer memory or media, and wherein said means for determining said column k in which said work quantity is minimum calculates said work quantity, based on the value of the sum of each product of the number of branches and said average number of branches in each column.

6. The method as set forth in claim 4, wherein said candidate character string lattice is expressed in a normal expression with a fixed character strength length.

* * * * *